US009710698B2

(12) United States Patent
Ma et al.

(10) Patent No.: US 9,710,698 B2
(45) Date of Patent: Jul. 18, 2017

(54) METHOD, APPARATUS AND COMPUTER PROGRAM PRODUCT FOR HUMAN-FACE FEATURES EXTRACTION

(71) Applicant: Nokia Technologies Oy, Espoo (FI)

(72) Inventors: Yong Ma, Beijing (CN); Yan Ming Zou, Beijing (CN); Kong Qiao Wang, Beijing (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/408,729

(22) PCT Filed: Apr. 24, 2013

(86) PCT No.: PCT/FI2013/050459
§ 371 (c)(1),
(2) Date: Dec. 17, 2014

(87) PCT Pub. No.: WO2014/001610
PCT Pub. Date: Jan. 3, 2014

(65) Prior Publication Data
US 2015/0205997 A1    Jul. 23, 2015

(30) Foreign Application Priority Data
Jun. 25, 2012 (CN) .......................... 2012 1 0223706

(51) Int. Cl.
*G06K 9/00* (2006.01)
(52) U.S. Cl.
CPC ..... *G06K 9/00281* (2013.01); *G06K 9/00261* (2013.01); *G06K 9/00288* (2013.01)
(58) Field of Classification Search
None
See application file for complete search history.

(56) References Cited

U.S. PATENT DOCUMENTS 6,807,290 B2    10/2004  Liu et al.
2002/0012454 A1  1/2002  Liu et al.
(Continued)

FOREIGN PATENT DOCUMENTS

CN          101216889 A       7/2008
EP            1 876 583 A1    1/2008
WO     WO 2010/119181 A1    10/2010

OTHER PUBLICATIONS

International Search Report and Written Opinion received for corresponding Patent Cooperation Treaty Application No. PCT/FI2013/050459, dated Sep. 11, 2013, 17 pages.
(Continued)

*Primary Examiner* — Sumati Lefkowitz
*Assistant Examiner* — David Perlman
(74) *Attorney, Agent, or Firm* — Alston & Bird LLP (57) ABSTRACT

The present invention provides a method for obtaining a human-face feature vector from a video image sequence, comprising: detecting a same human-face image in a plurality of image frames of the video sequence; dividing the detected human-face image into a plurality of local patches with a predetermined size, wherein each local patch is around or near a human-face feature point; determining a correspondence relationship between respective local patches of the same human-face image in the plurality of image frames of the video sequence; and using human-face local feature vector components extracted from respective local patches having a mutual correspondence relationship to form human-face local feature vectors representing facial points corresponding to the local patches. Besides, the present invention further provides an apparatus for obtaining a human-face feature vector from a video image sequence and a corresponding computer program product.

15 Claims, 6 Drawing Sheets

(56) References Cited

U.S. PATENT DOCUMENTS

| | | | |
|---|---|---|---|
| 2005/0201595 | A1 | 9/2005 | Kamei |
| 2006/0120571 | A1 | 6/2006 | Tu et al. |
| 2006/0244757 | A1* | 11/2006 | Fang ...................... G06T 15/04 345/582 |
| 2008/0120550 | A1 | 5/2008 | Oakley et al. |
| 2009/0232365 | A1 | 9/2009 | Berthilsson et al. |
| 2011/0135166 | A1* | 6/2011 | Wechsler ........... G06K 9/00288 382/118 |
| 2012/0257797 | A1* | 10/2012 | Leyvand ............ G06K 9/00221 382/118 |

OTHER PUBLICATIONS

Choi, Jy et al. "Face Feature Weighted Fusion Based on Fuzzy Membership Degree for Video Face Recognition". IEEE Transactions on Systems, Man and Cybernetics, Part B: Cybernetics. Aug. 2012, vol. 42, No. 4, pp. 1270-1282 [online], [retrieved on Aug. 29, 2013]. Original e-print on Jun. 12, 2012. Retrieved from the Internet: <URL:http://ieexplore.ieee.org/xpl/articleDetails.jsp?arnumber=6216445><DOI:10.1109/TSMCB.2012.2185693>.

Ahonen, T. et al. "Face Description with Local Binary Patterns: Application to Face Recognition". IEEE Transactions on Pattern Analysis and Machine Intelligence. Dec. 2006, vol. 28, No. 12, pp. 2037-2041 [online], [retrieved on Aug. 29, 2013]. Retrieved from the internet: <URL: http://ieexplore.ieee.org/xpl/articleDetails.jsp?arnumber=1717463><DOI:10.1109/TPAMI.2006.244>.

Supplementary European Search Report for Application No. EP 12 88 0158 dated May 30, 2016.

Li, X. et al., *Video Face Recognition Method Based on Weighting Similarity and Similiar Voting*, Journal of Hefei University of Technology, vol. 34, No. 2 (Feb. 2011) 221-224.

Office Action for Chinese Application No. 2012102237065 dated Mar. 28, 2016.

Office Action and Search Report for Chinese Patent Application No. 201210223706.5 dated Nov. 28, 2016, with English summary, 11 pages.

Supplementary European Search Report for Application No. EP 13 80 8762 dated Mar. 16, 2016.

Arashloo, S. R. et al., *Hierarchical Image Matching for Pose-Invariant Face Recognition*, BMVC (2009) 11 pages.

Cootes, T. F. et al., *Active Appearance Models*, IEEE Transactions on Pattern Analysis and Machine Intelligence, vol. 23, No. 6 (Jun. 2001) 681-685.

Dreuw, P. et al., *SURF-Face: Face Recognition Under Viewpoint Consistency Constraints*, BMVC (2009) 11 pages.

Fang, H. et al., *From Rank-N To Rank-1 Face Recognition Based on Motion Similarity*, BMVC (2009) 11 pages.

Liu, X., *Video-Based Face Model Fitting Using Adaptive Active Appearance Model*, Image and Vision Computing 28 (2010) 1162-1172.

Martinez, A. M. et al., *PCA Versus LDA*, IEEE Trans. On Pattern Analysis and Machine Intelligence, vol. 23. No. 2 (2001) 228-233.

Ojala et al., *Multiresolution Gray-Scale and Rotation Invariant Texture Classification With Local Binary Patterns*, IEEE PAMI 24(7) (2002) 971-987.

Patel, A. et al., *Shape-From-Shading Driven 3D Morphable Models for Illumination Insensitive Face Recognition*, BMVC (2009) 10 pages.

Ruiz-Hernandez, J. A. et al., *Face Recognition Using Tensors of Census Transform Histograms From Gaussian Features Maps*, BMVC (2009) 11 pages.

Shi, J. et al., *Good Features to Track*, Proc. IEEE Comput. Soc. Conf. Comput. Vision and Pattern Recogn., pp. 593-600, 1994.

Zhao, W. et al., *Discriminant Analysis of Principal Components for Face Recognition*, Proc. of the 3$^{rd}$ IEEE International Conference on Face and Gesture Recognition, FG'98 (Apr. 14-16, 1998), pp. 336-341.

Office Action for corresponding European Application No. 13 80 8762 dated May 12, 2017, 6 pages.

\* cited by examiner

METHOD, APPARATUS AND COMPUTER PROGRAM PRODUCT FOR HUMAN-FACE FEATURES EXTRACTION

RELATED APPLICATION

This application was originally filed as Patent Cooperation Treaty Application No. PCT/FI2013/050459 filed Apr. 24, 2013 which claims priority benefit to Chinese Patent Application 201210223706.5 filed Jun. 25, 2012.

FIELD OF INVENTION

The present invention generally relates to human face recognition, and more specifically, to video sequence-based human-face recognition.

BACKGROUND OF INVENTION

With the popularity of smart phones and electronic devices with camera and video recording functions, more and more camera applications and cloud computing-based services need to obtain human-face recognition of a live video for extracting facial metadata, based on video clips from the camera or in real time online For example, to use the human-face recognition for security operation of an access operation to an electronic device.

However, a challenge exists in directly performing human-face recognition from a video with respect to human-face recognition based on a still picture, because frame blurring and low-resolution frequently occur in the video, and in such circumstances, serious recognition error is inevitable.

By far, the video sequence-based face recognition mainly has the following three approaches:
1. Image Level Fusion Image level fusion is one directly performed on an acquired raw image. The image level fusion generally adopts a centralized fusion system to perform the fusion processing process. It is a low-level fusion, for example, a process of determining a target property by performing image processing to a blur image containing a plurality of pixels is just an image level fusion.

For human-face recognition, an image super-resolution algorithm may be specifically employed to rebuild the human-face image. The super-resolution algorithm is a technique for enhancing the resolution of an image or video, with a purpose that the resolution of the outputted image or video would be higher than any frame of any inputted image or video. Here, "enhancing the resolution" means making the existing content much clearer or that a user can see a detail that could be perceived previously. When it is relatively difficult or costly to obtain a high-quality image or video, it is quite essential to use the super-resolution algorithm. The process of rebuilding the image super-resolution may be generally performed in three steps:
(1) pre-processing, for example, de-noising, clip, etc.;
(2) alignment, and estimating a motion vector between the low-resolution sequences, and
(3) rebuilding, and fusing information of multiple frames of the low-resolution image.

The super-resolution rebuilding process of an image generally needs three-dimensional modeling, which results in a cumbersome computational complexity.

Besides, there is also a scheme of de-blurring an image and then restoring the image specifically directed to the cause of the blur, for example, restoring for a motion blur, and restoring for a defocus, etc. Its main purpose is to generate a clear picture so as to perform works such as recognition and judgment.

However, currently, the image level fusion for human-face recognition is mainly used for visual inspection, which is not very flexible and is quite sensitive to environment (for example noise), misalignment, and the like.
2. Feature Level Fusion The feature level fusion mainly extracts a local feature of a human face from among each frame of a video image. Since the same kind of samples have a certain distribution in space, image set sub-space (mutual sub-space) and manifold learning may be employed to reduce dimensions of the feature space of the sample, and then the dimension-reduced sample feature space is matched to the logged sample egien space, thereby performing human-face recognition.

In this scheme, all local features in a feature vector of the human face come from the same frame; therefore, it does not break away from the constraint of frame.
3. Classifier Level Fusion The classifier level fusion builds a multi-scale target classifier and a pose determiner, respectively, mainly based on scale variation, pose variation, and image feature information of an object, and estimates a confidence level of a target recognition result, a weight of adjacent frame pose variation, and a target scale weight; the recognition result of each frame is compared to an image sample in a database to score each frame. And then, the target image fusion is performed based on the score of each frame. However, the classifier level recognition mainly relies on the classifier of a single frame, and the decision based on the score of each frame; thus, it still has a drawback of inaccurate classification caused by insufficient feature extraction; besides, in a complex dynamic environment, there are fewer appropriate classifier algorithms to implement recognition of a dynamic target.

Therefore, there is a need for rapidly, accurately and robustly recognizing a human-face image from a video sequence.

SUMMARY OF INVENTION

The present invention resolves the above and other problems by providing a novel method for extracting a human-face local feature. According to the present invention, during a human-face tracking process of a video sequence, a set of face images belonging to a same person is obtained, and correspondence relationships between respective facial points of the face image are obtained using a facial point tracking technology. Human-face local feature vector components are extracted from respective facial points of the face image, and the extracted human-face local feature vector components are fused to obtain human-face local feature vectors base on the analysis of the face image. Next, the obtained human-face local feature vectors are combined into a human-face global feature vector of the entire human face so as to perform human-face recognition.

According to one aspect of the present invention, there is provided a method, comprising: detecting a same human-face image in a plurality of image frames of the video sequence; dividing the detected human-face image into a plurality of local patches with a predetermined size, wherein each local patch is around or near a human-face feature point; determining a correspondence relationship between respective local patches of the same human-face image in the plurality of image frames of the video sequence; and using human-face local feature vector components extracted from respective local patches having a mutual correspondence relationship to form human-face local feature vectors representing facial points corresponding to the local patches.

According to another aspect of the present invention, there is provided an apparatus for obtaining a human-face feature vector from a video sequence, comprising: a human-face detector configured to detect a same human-face image in a plurality of image frames of the video sequence; a facial point locator configured to divide the detected human-face image into a plurality of local patchs with a predetermined size, wherein each local patch is around or near a human-face feature point; a human-face tracker configured to determine a correspondence relationship between respective local patches of the same human-face image in the plurality of image frames of the video sequence; and a human-face local feature vector generator configured to use human-face local feature vector components extracted from respective local patches having a mutual correspondence relationship to form human-face local feature vectors representing facial points corresponding to the local patches.

According to a further aspect of the present invention, there is provided a computer program product comprising at least one computer-readable memory medium having executable computer readable program code instructions stored therein, wherein the computer-readable program code instructions comprise: a first program code instruction configured to detect a same human-face image in a plurality of image frames of a video sequence; a second program code instruction configured to divide the detected human-face image into a plurality of local patchs with a predetermined size, wherein each local patch is around or near a human-face feature point; a third program code instruction configured to determine a correspondence relationship between respective local patches of the same human-face image in the plurality of image frames of the video sequence; and a fourth program code instruction configured to use human-face local feature vector components extracted from respective local patches having a mutual correspondence relationship to form human-face local feature vectors representing facial points corresponding to the local patches.

According to a further aspect of the present invention, there is provided an apparatus, comprising: means for detecting a same human-face image in a plurality of image frames of the video sequence; means for dividing the detected human-face image into a plurality of local patches with a predetermined size, wherein each local patch is around or near a human-face feature point; means for determining a correspondence relationship between respective local patches of the same human-face image in the plurality of image frames of the video sequence; and means for using human-face local feature vector components extracted from respective local patches having a mutual correspondence relationship to form human-face local feature vectors representing facial points corresponding to the local patch.

According to the present invention, one or more human-face local feature vector components as fused may come from human-face local feature vector components of different frames. However, in the aforementioned feature level fusion method, all human-face local feature vector components in one human-face local feature vector come from the same frame, which does not break away from the constraints of frame.

Besides, according to the present invention, a detected human-face area will be divided under different scales into a plurality of local patches with a predetermined size, and human-face local feature vector components are extracted from these local patches having a mutual correspondence relationship, respectively, and are combined together to form a human-face local feature vector representing a facial point corresponding to each local patch, and then the human-face local feature vectors representing the facial points corresponding to respective local patches and obtained at each local patch size are combined to form a human-face global feature vector describing the entire human face so as to be used for human-face recognition. Besides, according to the present invention, all human-face global feature vectors obtained under different scales may be further combined to form a human-face global feature vector set so as to perform human-face recognition. All human-face global feature vectors obtained under different scales are combined to form a human-face global feature vector set, and the finally obtained multiple human face global feature vectors are more robust to pose offset of the human face and environment influence.

BRIEF DESCRIPTION OF SEVERAL VIEWS OF DRAWINGS

The present invention has been generally described above. Now, the present invention will be described with reference to the accompanying drawings that are not necessarily drawn by scale, wherein.

In the drawings, same or corresponding reference signs indicate the same or corresponding parts. Moreover, the number of components, members, and elements as illustrated in the drawings are only for exemplary illustration, not for limitation.

DETAILED DESCRIPTION OF INVENTION

Figure 1:
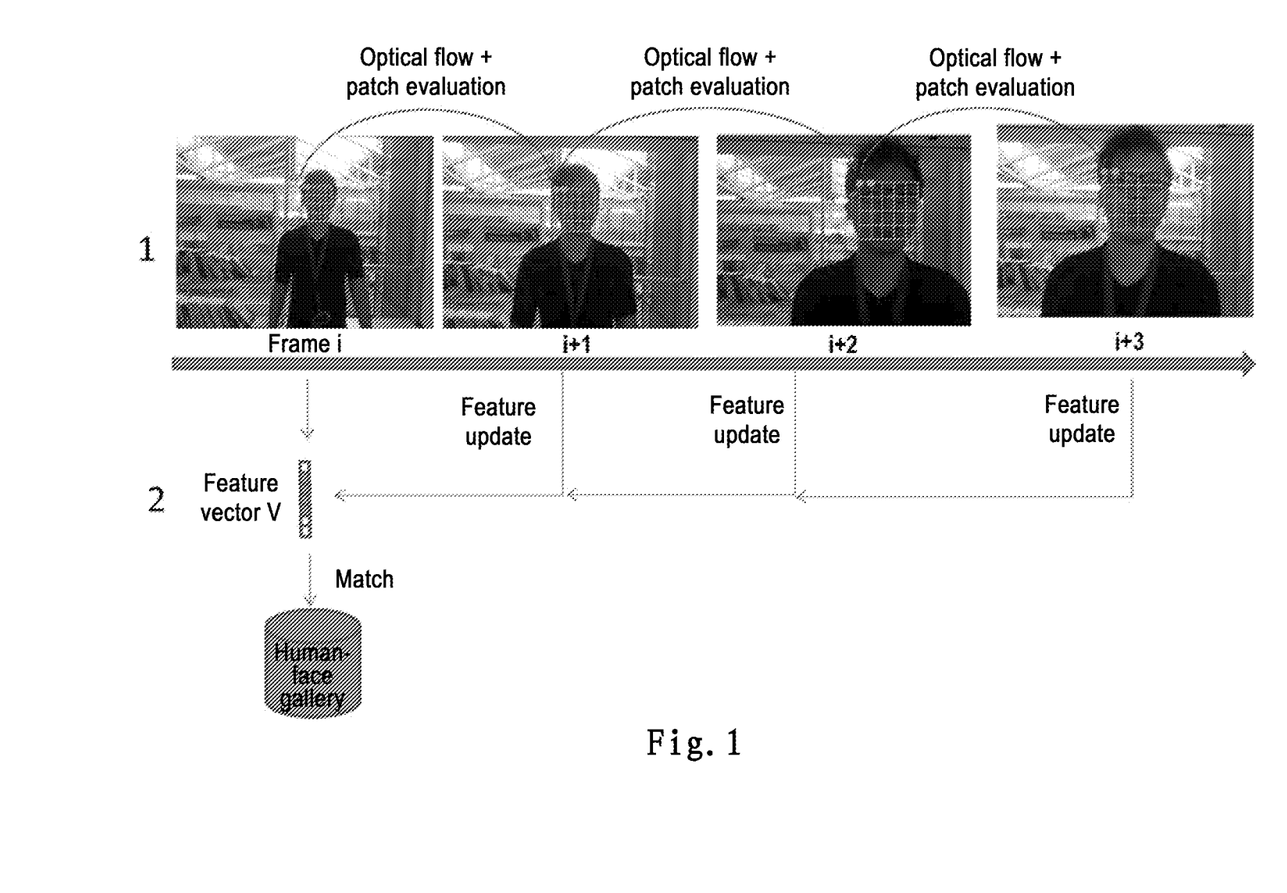
FIG. 1 shows a schematic diagram of a basic principle of the present invention.

With reference to FIG. 1, it generally illustrates the basic principle of the present invention. The four images from left to right represent four frames (from frame i to frame i+3) of images in a video sequence, which shows change of a person from far to near with respect to a camera lens. According to the present invention, first, human-face area detection is performed with respect to each frame of image. Then, the detected human-face area is divided into a plurality of local patches with a predetermined size, as shown by the grid in each human-face area in FIG. 1. Next, the correspondence relationship between each patch of a plurality of human-face areas may be determined by optical flow. Specifically, it may be implemented by KLT, and those skilled in the art may know the method of obtaining the correspondence relationship between the same facial point in immediately adjacent two frames in a video sequence by using KLT for example from "Good features to track" by Jianbo Shi and Carlo Tomasi, Proc. IEEE Comput. Soc. Conf. Comput. Vision and Pattern Recogn., pages 593-600, 1994. With reference to FIG. 1, human-face local feature vector components are extracted from respective patches of the human-face area of the ith frame of image to form human-face local feature vectors representing the facial points corresponding to the local patches. Next, human-face local feature vector components are extracted sequentially from local patches in a subsequent image frames having a correspondence relationship with the local patch of the ith frame of image and are evaluated (for their occluded level, etc.), so as to update the human-face local feature vectors representing the facial points corresponding to the local patches using the human-face local feature vector components extracted from the local patches in the subsequent image frames having a corresponding relationship with the local patches of the ith frame of image. Finally, the obtained human-face local feature vectors are combined into a human-face global feature vector describing the whole human face, and a template-based facial recognition method, such as principle component analysis (PCA)+ linear discrimination analysis (LDA), is employed to compare with the human-face feature vectors in a human-face gallery to perform human-face recognition. Those skilled in the art may know the above method for human-face recognition for example from W. Zhao, R. Chellappa, A. Krishnaswamy, Discriminant Analysis of Principal Components for Face Recognition, Proc. of the 3rd IEEE International Conference on Face and Gesture Recognition, FG'98, 14-16 Apr. 1998, Nara, Japan, pp. 336-341 and A. M. Martinez, A. C. Kak, PCA versus LDA, IEEE Trans. on Pattern Analysis and Machine Intelligence, Vol. 23, No. 2, 2001, pp. 228-233.

Figure 2:
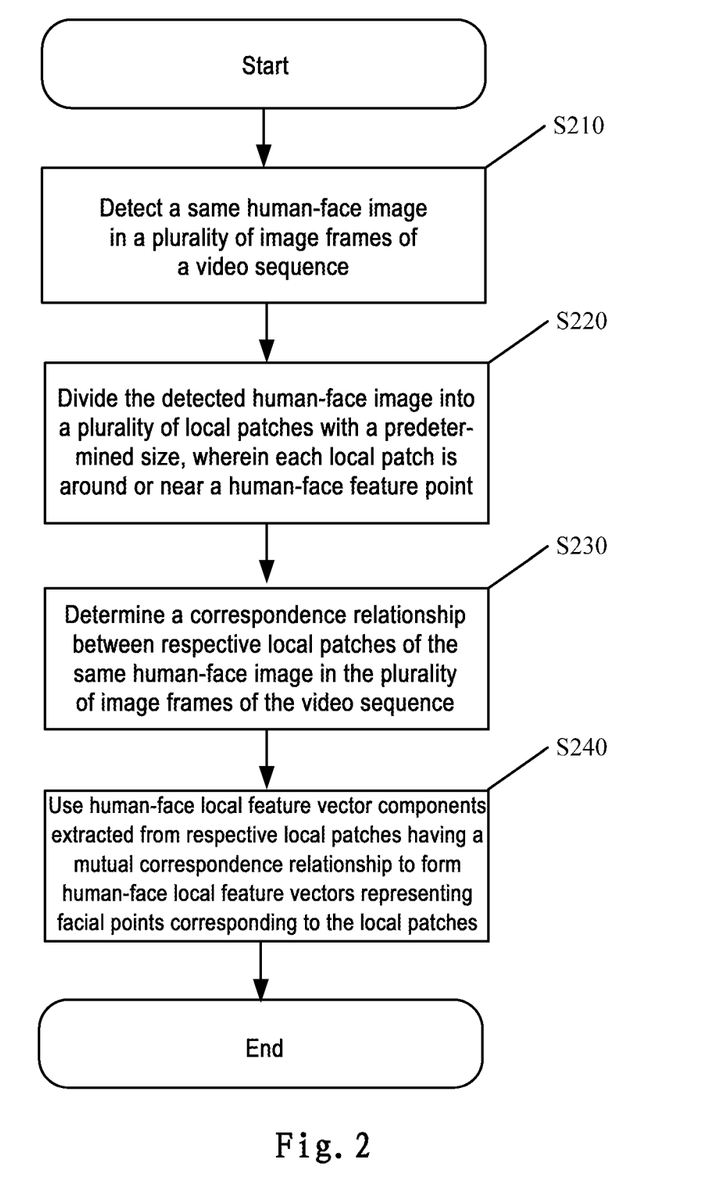
FIG. 2 shows a flowchart of a method for generating human-face local feature vectors according to an exemplary embodiment of the present invention.

FIG. 2 shows a flow chart of a method according to an exemplary embodiment of the present invention. It should be understood that each block, step or operation in the flow chart, and/or a combination of blocks, steps or operations in the flow chart may be implemented by various means. The means for implement blocks, steps or operations in the flow chart and/or combinations of the blocks, steps, or operations in the flow chart may comprise hardware, firmware and/or software, the software comprising one or more computer program code instructions, program instructions, or executable computer readable program code instructions. In one exemplary embodiment, one or more processes described here may be implemented by program code instructions. At this point, the program code instructions implementing the process described here may be stored by a memory device of the apparatus or stored thereon and executed by a processor. It should be noted that any such program code instructions may be loaded onto a computer or other programmable device to produce a machine, such that the instructions executed on the computer or other programmable device to create means for implementing the functions designated in the blocks, steps, or operations of the flow chart. These program code instructions may be stored in a computer readable storage medium, which may guide a computer, processor or other programmable device to work in a particular manner, for producing an article according to the instructions stored in the computer readable storage medium, the instructions comprising instruction means for implementing the functions designated in the blocks, steps or operations of the flow chart. The program code instructions may also be loaded on the computer, processor or other programmable devices, such that a series of operation steps may be performed on the computer, processor, or other programmable device or performed thereby, to thereby produce a process implemented by the computer, such that the instruction executed on the computer, processor or other programmable device provide steps for implementing the functions designated in the blocks, steps or operations of the flow chart.

Therefore, the blocks, steps or operations in the flow chart support a combination of means for performing designated functions, a combination of steps for performing designated functions, and program code instruction means for performing designated functions. It would be further appreciated that one or more blocks, steps or operations in the flow chart, and a combination of blocks, steps or operations in the flow chart may be implemented by a dedicated hardware-based computer system or a dedicated hardware and program code instructions, wherein the computer system performs designated functions or steps.

With reference to FIG. 2, in step S210, a same human-face image in a plurality of image frames of a video sequence is detected. The video sequence may have a plurality of frames having an image of the same human face, and of course, in each frame of image, there may be other images besides the human face. In order to implement the method of the present invention, it is first required to detect the same human-face image in the plurality of frames of images, which may be implemented by a human-face detector. As an example, a human-face detector may be obtained through the following operation: during an offline training phase, millions of or more normalized (for example 20*20 pixels) human-face image data and non-human-face image data are collected. Based on these normalized training data, one or more LBP features may be extracted around each pixel, and then these features extracted from all pixels may be used to form a LBP feature pool. Based on each LBP feature, a decision tree is used to build a weak classifier. By using an AdaBoosting learning strategy, a best weak classifier is selected in each iteration. Finally, based on a weighted combination of many weak classifiers, a strong classifier having a high human-face detection rate and a low misalarm rate is formed. This final strong classifier may be used as the human-face detector of the present invention. The human-face detector may detect a rough position, scale, roll angle, and pitch angle of the human face.

In step S220, the detected human-face image is divided into a plurality of local patches with a predetermined size, wherein each local patch is around or near a human-face feature point.

The position of a human-face feature point (for example, the center of an eye, a corner of an eye, a corner of the mouth, and the like) may be precisely located on the detected face image by a facial point locator. According to one embodiment of the present invention, a local binary pattern (LBP) feature+AdaBoosting classifier is employed to perform human-face image detection and facial point location. Those skilled in the art may know the human-face image detection and facial point location method for example from Ojala & Maenpaa (2002) Multiresolution gray-scale and rotation invariant texture classification with Local binary Patterns, IEEE PAMI 24(7):971-987. The facial point locator may be built in a manner similar to the human-face detector by using a corresponding training sample. Specifically, each time when the human-face area is scaled, all sub-windows of training data with the same resolution are evaluated through a trained classifier, and all positive responses are fused together based on the positions and confidence levels of the sub-windows so as to output the final human-face detection result, thereby implementing the facial point location process.

Figure 4:
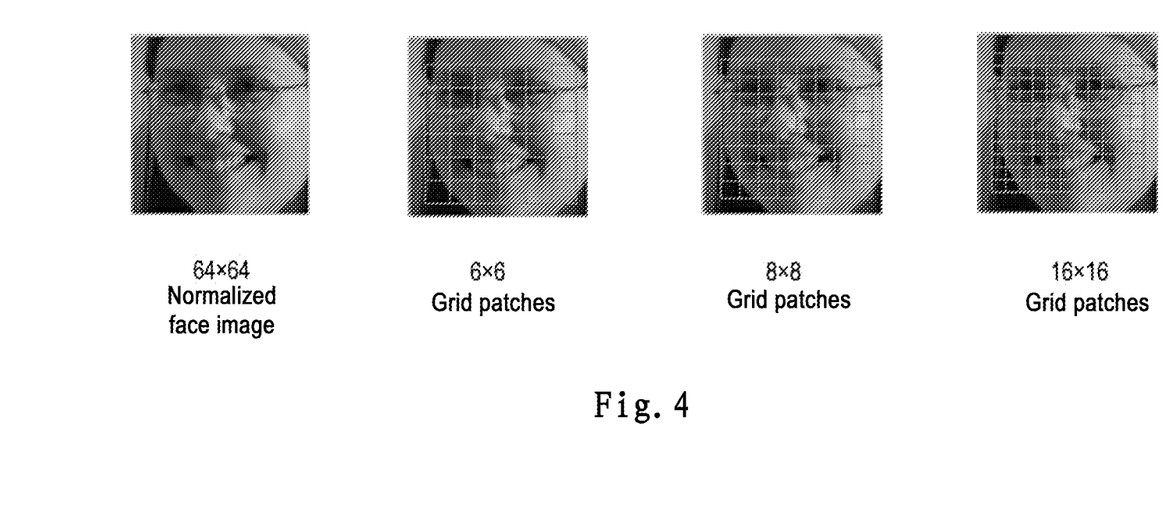
FIG. 4 shows a schematic diagram of dividing a human-face area into local patches of different sizes according to an exemplary embodiment of the present invention.

Specifically, the step S220 may be implemented through the following steps: after detecting the same human-face image in a plurality of image frames of the video sequence and accomplishing location of a major facial point, the facial area is cut and normalized and scaled into a predetermined resolution; at this point, the grids may be placed on the human-face area, as shown in FIG. 1 and FIG. 4 (FIG. 1 shows a 5*5 grid, and FIG. 4 shows a 6*6 grid, 8*8 grid, and 16*16 grid), wherein each grid area (or referred to as a local patch) is around or near a facial point.

Next, in step S230, a correspondence relationship between each local patch of the same human-face image in the plurality of image frames of the video sequence is determined.

Figure 3:
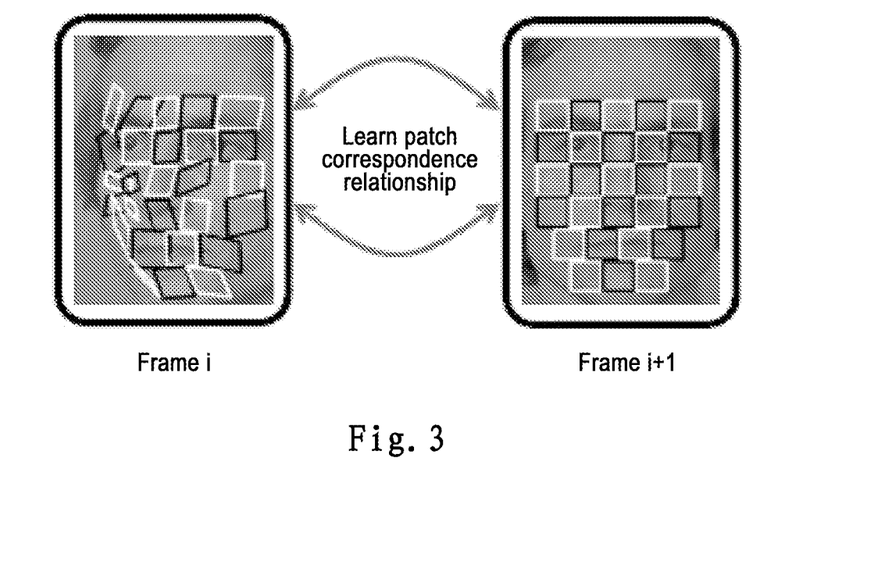
FIG. 3 shows a schematic diagram of a correspondence relationship between respective patches of a human-face area in adjacent frames of a video sequence according to an exemplary embodiment of the present invention.

With reference to FIG. 3, it shows a correspondence relationship between respective local patches of human-face areas of adjacent frames of a video sequence. FIG. 3 shows the ith frame of image and the following i+1st frame of image in the video sequence. Although FIG. 3 merely shows two adjacent frames of images, the method of the present invention is not merely limited to two frames of images, but may be applied to a consecutive plurality of frames of images.

According to the embodiments of the present invention, as depicted above with reference to FIG. 1, a method such as optical flow field may be used to obtain a correspondence relationship between the same facial point (i.e., each patch) in immediately adjacent frames.

After the operation of step S230 is accomplished, the process enters into step S240. Here, human-face local feature vector components extracted from respective local patches having a mutual correspondence relationship are used to form human-face local feature vectors representing facial points corresponding to the local patches. Specifically, it may also be implemented through the following steps: first, human-face local feature vector components are extracted from respective patches having a mutual correspondence relationship in different image frames. Then, the pose of each human face in different image frames is determined, which may be implemented based on a LBP predicted pose angle by extracting LBP feature and using Canonical Correlation Analysis recursion. After determining the pose of each human face in each image frame, the human-face local feature vector components extracted from respective patches are used to form human-face local feature vectors representing facial points corresponding to the local patches, which may be expressed in the following equation:

$$V_P = \{V_{i,P}, V_{i+1,P}, \ldots, V_{i+n,P}\},$$

Wherein $V_P$ denotes the human-face local feature vector of the facial point corresponding to each patch P, and $V_{i,P}$ denotes a human-face local feature vector component extracted from the patch P of the ith frame.

According to one embodiment of the present invention, the step S240 may specifically comprise the following steps: identifying different poses of the same human face in a plurality of image frames of the video sequence; extracting human-face local feature vector components merely from respective un-occluded local patches having a mutual correspondence relationship based on the identified different poses of the same human face in the plurality of image frames; combining the human-face local feature vector components extracted from the respective un-occluded local patches having a mutual correspondence relationship to form human-face local feature vectors representing facial points corresponding to the local patches.

Specifically, referring to FIG. 3, through determining the human-face poses, it may be determined that the human face in the ith frame of image looks to the right side, while the human face in the i+1st frame of image looks substantially to the forward. At this point, it may be determined that in the ith frame of image, the right-side area of the human face is occluded. Therefore, it may be considered to use the human-face local feature vector components extracted from the corresponding patches in the right-side area of the i+1st frame of the image as a part of the human-face feature vectors representing the facial points corresponding to the patches, instead of the human-face local feature vector components extracted from the corresponding patches in the right-side area of the ith frame of image, because at this point, the human-face right-side area in the ith frame of image is occluded. Specifically, $P_{j,k}$ here denotes each patch resulting from dividing the human-face area in the ith frame of image, wherein j denotes the row number where the patch is located (from top to down), while k denotes the column number where the patch is located (from left to right). Correspondingly, $P'_{j,k}$ denotes each patch in the i+1 frame having a corresponding relationship with each $P_{j,k}$. For example, for each patch $P_{1,1}$ in the ith frame of image, it may be determined through judging the human-face pose that the human-face area corresponding to the patch might be occluded; thus, at this point, the human-face local feature vector component is extracted from the patch $P'_{1,1}$ in the i+1 frame of image having a correspondence relationship therewith as a part of the human-face local feature vector of the facial point corresponding to the patch. Similarly, it is also suitable for the patches $P_{2,1}$, $P_{3,1}$, $P_{1,2}$, $P_{1,3}$ and the like which are likewise occluded. Although FIG. 3 merely illustrates two consecutive frames of images, it is apparent that for subsequent i+2, i+3, ... images, if any one of the patches $P''_{1,1}$, $P'''_{1,1}$ ... having a correspondence relationship with $P_{1,1}$ is judged as being occluded, no human-face local feature vector components are extracted from this patch. On the contrary, if it is judged that none of these patches $P''_{1,1}$, $P'''_{1,1}$ ... is occluded, the human-face local feature vector component may be extracted from the patch as a part of the feature vector set corresponding to the facial point.

An advantage of this embodiment of the present invention lies in that since the step of extracting human-face local feature vector components from the occluded local patch is discarded, it avoids the over large background noise caused by the human-face local feature vector components extracted from the occluded local patch to the final human-face local feature vector, which would affect the accuracy of human-face recognition. Besides, since no human-face local feature vector components are extracted from the occluded local patches, it reduces the work load of extracting human-face feature local vector components and shortens the time for extracting human-face local feature vector components.

According to another embodiment of the present invention, the step S240 may specifically comprise the following steps: identifying different poses of the same human face in a plurality of image frames of the video sequence; weight combining, based on the identified different poses of the same human face in different image frames the human-face local feature vector components extracted from respective local patches having a mutual corresponding relationship to form human-face local feature vectors representing the facial points corresponding to the local patches.

Specifically, further referring to FIG. 3, at this point, although it has been judged that the human-face area corresponding to the patch $P_{1,1}$ in the ith frame image is occluded, a human-face local feature vector component is still extracted from the patch. Likewise, a human-face local feature vector component is also extracted from the patch $P'_{1,1}$ having a correspondence relationship with $P_{1,1}$ in the i+1st fame of image. Since it has been judged at this point that the patch $P_{1,1}$ of the ith frame of image is occluded, when forming a human-face local feature vector representing the facial point corresponding to the patch, it will be considered to assign the human-face local feature vector a relatively small weight such that it will not cause an over large background noise component to the finally formed human-face local feature vector; while for the patch $P'_{1,1}$ in the i+1st frame, since it has been judged that the i+1st frame of image is substantively facing forward, a relatively large weight may be assigned thereto, because it will not cause a very large background noise component to the formed local feature vector. Likewise, although FIG. 3 merely illustrates two consecutive frames of images, it is apparent that for subsequent i+2, i+3, . . . images, the same method is also applicable. At this point, the obtained human-face local feature vector may be expressed as:

$$V_P = \{a_1 V_{i,P}, a_2 V_{i+1,P}, \ldots, a_n V_{i+n,P}\},$$

wherein $a_1, a_2, \ldots, a_n$ denote weights of the human-face local feature vector components extracted from the patches having a correspondence relationship in each frame, respectively.

The advantage of another embodiment of the present invention lies in that through extracting human-face local feature vector components from each local patch having a mutual correspondence relationship and weight combining them to form a human-face local feature vector, the resulting human-face local feature vector comprises more human-face local feature vector components than a human-face local feature vector formed by human-face local feature vector components merely extracted from un-occluded local patches, which inevitably improves accuracy for subsequent human-face recognition. Meanwhile, by assigning different weights to the human-face local feature vector components extracted from each local patch having a relevant correspondence relationship based on human face poses, the human-face local feature vector components extracted from each local patch would play different roles in the subsequent human-face recognition process, which, on the one hand, restricts the over large background noise caused by the human-face local feature vector components extracted from the occluded local patches to the formed human-face local feature vector, and further improves the accuracy of human-face recognition.

According to the embodiments of the present invention, there further comprises a step of resizing the plurality of local patches. Specifically, it may be realized through re-sizing the grids on the human-face area, as shown in FIG. 4.

FIG. 4 shows a diagram of dividing a human-face area into local patches of different sizes according to an embodiment of the present invention. FIG. 4 shows the same frame of image, wherein the first image (from left to right) shows a standard 64*64-pixel human-face image, which is obtained after detecting and locating the human-face area in the image as described above. The second image shows dividing the human-face image in the first image into a 6*6-grid patches, the third image shows dividing the human-face image in the first image into a 8*8-grid patches, and the last image shows dividing the human-face image in the first image into a 16*16-grid patches. In these images, each patch in the grid patches is around or near a facial point.

After resizing the plurality of local patches, steps S230-S240 are repeated to extract human-face local feature vector components from each resized local patches having a mutual corresponding relationships to form a human-face local feature vector representing the facial point corresponding to the resized local patch.

Specifically, with reference to FIG. 4, based on dividing different scales of a human-face area as shown in the second to fourth images, the human-face local feature vector forming process is unanimously executed with reference to steps S230-240. Then, all resulting human-face local features are combined together to form a human-face global feature vector describing the whole human face. Next, human-face recognition is performed using the resulting human-face global feature vector.

The advantage of this embodiment lies in that in specific operation, for example, the located human-face area may be first divided into a 6*6 grid, and at this point, human-face local feature vectors are obtained by extracting human-face local feature vector components using the method as depicted with reference to steps S230-S240, and then, the resulting human-face local feature vectors are combined into a human-face global feature vector which is compared with human-face feature vectors in a human face gallery to perform human-face recognition. If the human face can be recognized now, the subsequent step of further dividing the human-face area will become unnecessary. In this way, it may save computational resources and improve the recognition speed, because compared with dividing the human-face area into 8*8 grid, dividing the human-face area into 6*6 grid apparently may reduce the work load for extracting the human-face local feature vector components corresponding to the patches.

Although the speed of extracting human-face local feature vector components can be improved by dividing the human-face areas into less grid patches to extract human-face local feature vector components, it also brings about the problem of inaccurate recognition. It is because a larger grid may be very sensitive to facial point change. Therefore, according to the present invention, after dividing the human-face area into 6*6 grid patches to extract the human-face local feature vector components, the human-face area is further divided into 8*8 grid patches (the second image), 16*16 grid patches (the third image) . . . to continue extracting human-face local feature vector components to obtain corresponding human-face local feature vectors, and then the human-face local feature vectors obtained respectively under different divisions are combined into human global feature vectors describing the whole human-face. Finally, all human-face global feature vectors obtained under different divisions are combined together to form a human-face global feature vector set for subsequent human-face recognition operation.

The practice shows that the human-face local feature vector components extracted from the patches divided in different scales in the human-face area have been proved to be robust to human-face poses and facial expression variations (for this point, please refer to "SIFT feature matching for face recognition" in BMVC 2009).

According to one embodiment of the present invention, after step S240, there may further comprise a step of combining the resulting human-face local feature vectors representing facial points corresponding to respective local patches to form a human-face global feature vector. The resulting human-face global feature vector therefore represents the human-face local feature vectors representing all facial points corresponding to all local patches, and then, the resulting human-face global feature vector may be used to compare with human-face feature vectors in the human-face gallery to perform human-face recognition. Similarly, after resizing each local patch, the resulting human-face local feature vectors representing the facial points corresponding to each resized local patches may further be combined to form a human-face global feature vector, and the resulting human-face global feature vector therefrom comprises human-face local feature vectors representing all facial points corresponding to all resized local patches, and then, the resulting human-face global feature vector may be used to compare with the human-face feature vectors in the human face gallery to perform human face recognition.

According to another embodiment of the present invention, there further comprises a step of combining human-face global feature vectors obtained under different local patch sizes to form a human-face global feature vector set. The human-face global feature vector set resulting from this step comprises a plurality of human-face global feature vectors, wherein each human-face global feature vector comprises human-face local feature vector representing all facial points corresponding to local patches of a certain size. Since the human-face global feature vector set resulting from this operation comprises a plurality of human-face global feature vectors formed by combining human-face local feature vectors extracted from different sizes of local patches having a mutual correspondence relationship, it is robust to change in human face poses and human expressions; therefore, it may play a better role during the process of comparing with the human-face feature vectors in the human-face gallery to perform human face recognition.

Figure 5:
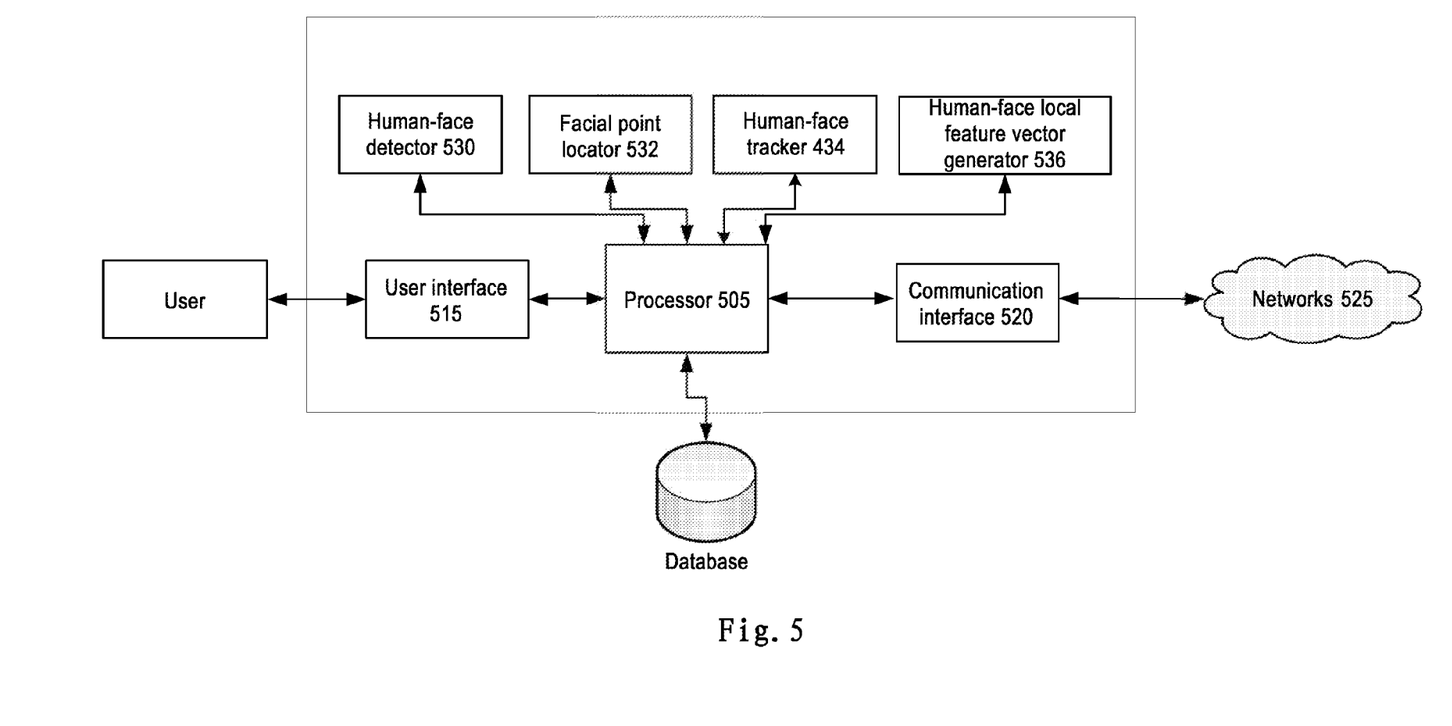
FIG. 5 shows a block diagram of an apparatus configured to generate human-face local feature vectors according to an exemplary embodiment of the present invention.

FIG. 5 shows an exemplary device 500 that may provide a correlation indication. According to various exemplary embodiments of the present invention, the device 500 may be implemented as a wired or wireless communication device of any type or included therein as a component of these devices. The wired or wireless communication device is for example a mobile terminal, an access point such as a base station, or any combination thereof, wherein the mobile terminal includes for example a mobile phone, a portable digital assistant (PDA), a pager, a mobile TV, a gaming device, a mobile computer, a laptop, a camera, a recorder, an audio/video player, a radio receiver and/or a global positioning system (GPS) device, an access point such as a base station, or any combination of the foregoing devices, and the like. Besides, the device 500 may be configured to implement various aspects of the present invention as depicted here, for example, including various exemplary methods of the present invention, wherein these methods may be implemented by a hardware or software configured processor, a computer readable medium, and the like.

The device 500 may comprises a processor 505, a memory device 510, and a communication interface 520, or may communicate with these components. In some embodiments, the device 500 may also comprise a user interface 515. The processor 505 may be implemented into various means including for example, a microprocessor, a co-processor, a controller, or various kinds of other processors, including an integrated circuit, for example, an ASIC (application-specific integrated circuit), FPGA (field programmable gate array) or hardware accelerator. In an exemplary embodiment, the processor 505 may be configured to execute the instructions stored in the memory device 510 or the instructions accessible to the processor 505. The processor 505 may also be configured to facilitate communication via the communication interface 520 by for example controlling the hardware and/or software in the communication interface 520.

The memory device 510 may be a computer readable memory medium which may include a volatile and/or non-volatile memory. For example, the memory device 510 may comprise a random access memory (RAM) including a dynamic and/or static RAM, an on-chip or off-chip cache memory, etc. Besides, the memory device 510 may comprise a non-volatile memory which may be embedded and/or movable, and for example may comprise a read-only memory, a flash memory, a magnetic storage device (for example, a hard disk, a floppy driver, a magnetic tape, and the like), an optical disk driver and/or medium, a non-volatile random access memory (NVRAM), and the like. The memory device 510 may comprise a cache area for temporarily storing data. In this point, some or all memory devices 510 may be included in the processor 505.

Besides, the memory device 510 may be configured to store memory information, data, application, computer-readable program code instructions, and the like, such that the processor 505 and the device 500 can execute various functions according to the exemplary embodiments of the present invention. For example, the memory device 510 may be configured to buffer the input data processed by the processor 505. Additionally or alternatively, the memory device 510 may be configured to store the instructions executed by the processor 505.

The communication interface 520 may be any device or apparatus implemented by hardware, software, or a combination of hardware and software; these devices or apparatuses are configured as any other device or module receiving and/or sending data from/to a network and/or communicating with the device 500. In this point, the communication interface 520 may for example comprise an antenna, a transmitter, a receiver, a transceiver, and/or support hardware including a processor or software for supporting communication with the network 525 which may be any type of wired or wireless network. Via the communication interface 520 and the network 525, the device 500 may communicate with various other network entities. In this point, the network 525 may comprise an access point.

The communication interface 520 may be configured to provide communication according to any wired or wireless communication standard. For example, the communication interface 520 may be configured for communication according to the following contents: second-generation (2G) wireless communication protocol IS-136 (time-division multi-access (TDMA)), GSM (global mobile communications system), IS-95 (code-division multi-access (CDMA)), third-generation (3G) wireless communication protocol, such as universal mobile telecommunications system (UMTS), CDMA2000, wideband CDMA (WCDMA) and time-division synchronous CDMA (TD-SCDMA), 3.9-generation (3.9G) wireless communication protocol, for example, evolved universal terrestrial wireless access network (E-UTRAN), and the fourth-generation (4G) wireless communication protocol, advanced international mobile telecommunications (IMT-Advanced) protocol, including LTE-advanced long-term evolution (LTE) protocol, etc. Besides, the communication interface 520 may be configured to provide communication according to the following technologies, such as radio frequency (RF), infrared (IrDA), or any one of a plurality of different wireless networking technologies, including WLAN technologies, such as IEEE 802.11 (for example, 802.11a, 802.11b, 802.11g, 802.11n, etc.), wireless local area network (WLAN) protocol, such as WorldWide Interoperability for Microwave Access (Wi-MAX) of IEEE 802.16 and/or IEEE 802.15, Bluetooth (BT), ultra wideband (UWB) wireless personal area network (WPAN) technologies, and the like.

The user interface 515 may communicate with the processor 505 to receive user input at the user interface 515 and/or provide output to the user, for example, audible, visual, mechanical or other output indication. The user interface 515 for example may include a keyboard, a mouse, a joy stick, a display (for example, a touch screen display), a microphone, a speaker, or other input/output mechanism. In some exemplary embodiments, such as when the device 500 is implemented as a server, the user interface may be limited or even eliminated.

The human-face detector 530, facial point locator 532, human-face tracker 534, and human-face local feature vector generator 536 of the device 500 may be any apparatus or device implemented by hardware, software, or a combination thereof, such as a processor 505 for implementing software instructions or hardware configured processor 505 which is configured to perform the functions of the human-face detector 530, facial point locator 532, human-face tracker 534, and human-face local feature vector generator 536 as depicted here. In an exemplary embodiment, the processor 505 may include or control the human-face detector 530, the facial point locator 532, the human-face tracker 534, and the human-face local feature vector generator 536. In various exemplary embodiments, the human-face detector 530, the facial point locator 532, the human-face tracker 534, and the human-face local feature vector generator 536 may reside on different devices, such that some or all functions of the human-face detector 530, the facial point locator 532, the human-face tracker 534, and the human-face local feature vector generator 536 may be executed by the first device, and the remaining functions of the human-face detector 530, the facial point locator 532, the human-face tracker 534, and the human-face local feature vector generator 536 may be executed by one or more other devices.

The human-face detector 530 of the device 500 is configured to detect a same human-face image in a plurality of image frames of a video sequence. The video sequence may be a video sequence stored in the memory device 510 or a video sequence received from an external input device or external memory via the user interface 515. The human-face detector 530 detects the human-face image in a plurality of image frames of the video sequence in a manner as depicted in step S210 with reference to FIG. 2.

The facial point locator 532 of the device 500 is configured to divide the detected human-face image into a plurality of local patches with a predetermined size in a manner as depicted in step S220 with reference to FIG. 2, wherein each local patch is around or near a human face feature point. Specifically, it may be implemented by adding grid on the detected human-face image.

The human-face tracker 534 of the device 500 is configured to determine a correspondence relationship between respective local patches of the same human-face image in a plurality of image frames of the video sequence, and the human-face local feature vector generator 536 of the device 500 is configured to use human-face local feature vector components extracted from respective local patches having a mutual correspondence relationship to form human-face local feature vectors representing the facial points corresponding to the local patches, as depicted in step S230 of FIG. 2.

According to one embodiment of the present invention, the human-face local feature vector generator 536 is further configured to identify different poses of the same human face in a plurality of image frames of the video sequence; extract human-face local feature vector components merely from respective un-occluded local patches having a mutual correspondence relationship based on the identified different poses of the same human face in the plurality of image frames; combine the human-face local feature vector components extracted from the respective un-occluded local patches having a mutual correspondence relationship to form human-face local feature vectors representing the facial points corresponding to the local patches.

According to another embodiment of the present invention, the human-face local feature vector generator 536 is further configured to identify different poses of the same human face in a plurality of image frames of the video sequence; and weight combine, based on the identified different poses of the same human face in different image frames, the human-face local feature vector components extracted from respective local patches having a mutual corresponding relationship to form human-face local feature vectors representing the facial points corresponding to the local patches.

According to the embodiments of the present invention, the facial point locator 534 is further configured to resize the plurality of local patches to obtain the human-face local feature vectors representing the facial points corresponding to each resized local patches.

According to the embodiments of the present invention, the human-face local feature vector generator 536 is further configured to combine the resulting human-face local feature vectors representing the facial points corresponding to respective local patches to form a human-face global feature vector.

According to the embodiments of the present invention, the human-face local feature vector generator 536 is further configured to combine the resulting human-face local feature vectors representing the facial points corresponding to respective resized local patches to form a human-face global feature vector.

According to the embodiments of the present invention, the human-face local feature vector generator 536 is further configured to combine the resulting human-face global feature vectors obtained under different local patch sizes to form a human-face global feature vector set.

According to the embodiments of the present invention, the human-face local feature vector generator 536 is further configured to use the resulting human-face global feature vectors to perform human-face recognition.

According to the embodiments of the present invention, the human-face local feature vector generator 536 is further configured to use the resulting human-face global feature vector set to perform human-face recognition.

Figure 6:
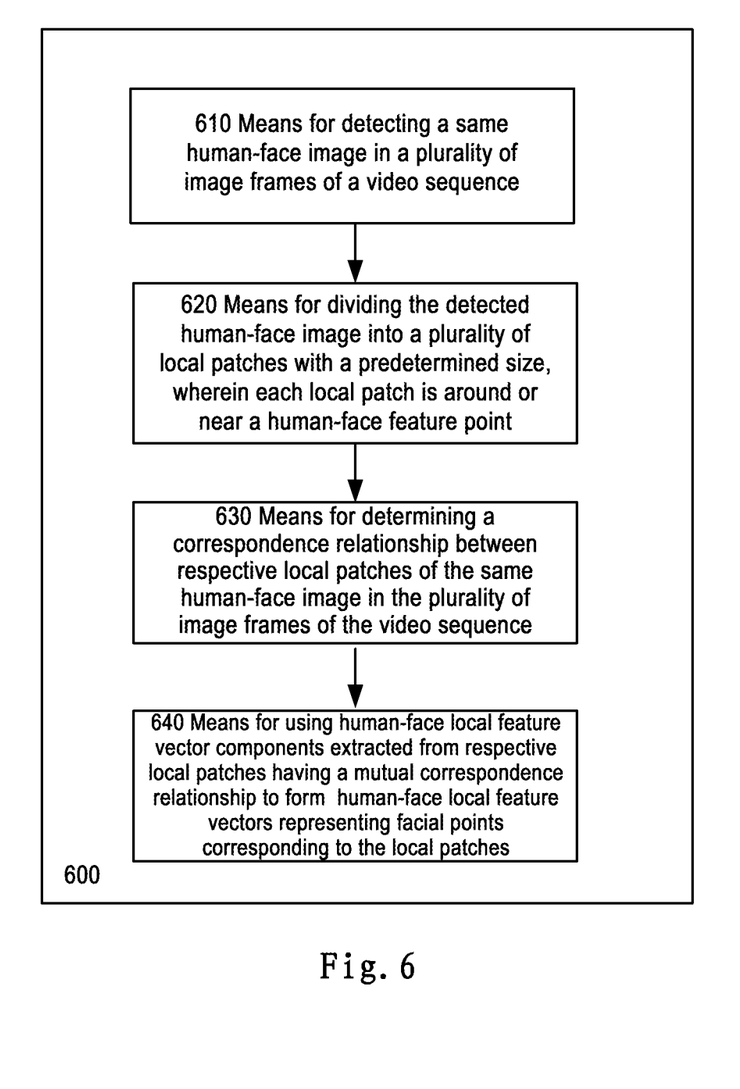
FIG. 6 shows a schematic diagram of an apparatus for generating human-face local feature vectors according to an exemplary embodiment of the present invention.

FIG. 6 shows a diagram of an apparatus 600 for generating a human-face local feature vector according to an exemplary embodiment of the present invention.

Specifically, the apparatus for generating a human-face local feature vector according to the present invention comprises: means 610 for detecting a same human-face image in a plurality of image frames of a video sequence; means 620 for dividing the detected human-face image into a plurality of local patches of a predetermined size, wherein each local patch is around or near a human-face feature point; means 630 for determining a correspondence relationship between respective local patches of the same human-face image in the plurality of image frames of the video sequence; and means 640 for using human-face local feature vector components extracted from respective local patches having a mutual correspondence relationship to form human-face local feature vectors representing the facial points corresponding to the local patches.

According to one embodiment of the present invention, wherein the means 640 for using human-face local feature vector components extracted from respective local patches having a mutual correspondence relationship to form the human-face local feature vectors representing facial points corresponding to the local patches further comprises: means for identifying different poses of the same human face in a plurality of image frames of the video sequence; means for extracting human-face local feature vector components only from respective un-occluded local patches having a mutual correspondence relationship based on the identified different poses of the same human face in the plurality of image frames; and means for combining the human-face local feature vector components extracted from the respective un-occluded local patches having a mutual correspondence relationship to form human-face local feature vectors representing the facial points corresponding to the local patches.

According to another embodiment of the present invention, wherein the means 640 for using human-face local feature vector components extracted from respective local patches having a mutual correspondence relationship to form human-face local feature vectors representing facial points corresponding to the local patches further comprises: means for identifying different poses of the same human face in a plurality of image frames of the video sequence; and means for weight combining the human-face local feature vector components extracted from respective local patches having a mutual correspondence relationship into human-face local feature vectors representing the facial points corresponding to the local patches based on the identified different poses of the same human face in the different image frames.

According to the embodiments of the present invention, dividing the detected human-face image into a plurality of local patches having a predetermined size is implemented by adding a grid on the detected human-face image.

According to the embodiments of the present invention, the apparatus further comprises means for resizing the plurality of local patches to obtain human-face local feature vectors representing the facial points corresponding to respective resized local patches.

According to the embodiments of the present invention, the apparatus further comprises a means for combining the resulting human-face local feature vectors representing facial points corresponding to respective local patches to form human-face global feature vectors.

According to the embodiments of the present invention, the apparatus further comprises a means for combining the resulting human-face local feature vectors representing facial points corresponding to respective resized local patches to form human-face global feature vectors.

According to the embodiments of the present invention, the apparatus further comprises means for combining human-face global feature vectors obtained under different local patch sizes to form a human-face global feature vector set.

According to the embodiments of the present invention, the apparatus further comprises means for recognizing a human face using the resulting human-face global feature vectors.

According to the embodiments of the present invention, the apparatus further comprises means for recognizing a human face using the resulting human-face global feature vector set.

Those skilled in the art benefited from the teaching embodied in the above depictions and the associated drawings would contemplate various modifications and other embodiments of the present invention as depicted here. Thus, it would be appreciated that the present invention is not limited the disclosed particular embodiments, and intends to include the modifications and other embodiments in the scope of appended claims. Besides, although the above depiction and associated drawings have described exemplary embodiments in some exemplary combination environments of the elements and/or functions, it should be understood that different combinations of elements and/or functions may be provided by alternative embodiments without departing from the scope of the appended claims. In this regard, for example, besides what has been explicitly depicted above, different combinations of elements and/or functions are also considered and may be disclosed in some of the appended claims. Although particular terms are used here, they are only used in a general and descriptive sense, not intended for limitation.

What is claimed is:

1. A method comprising:
   detecting a same human-face image in a plurality of image frames of a video sequence;
   dividing the detected human-face image into a plurality of local patches with a predetermined size, wherein each local patch is around or near a human-face feature point;
   determining a correspondence relationship between respective local patches of the same human-face image in the plurality of image frames of the video sequence;
   determining a first local feature from a first frame of the plurality of image frames of the same human-face image;
   determining a second local feature, different than the first local feature, from a second frame of the plurality of image frames of the same human-face image;
   using human-face local feature vector components extracted from respective local patches having a mutual correspondence relationship based on the first local feature and the second local feature of the first and the second frames of the same human-face image to form human-face local feature vectors representing the facial points corresponding to the local patches, wherein formation of the human-face local feature vectors comprises resizing the plurality of local patches to obtain the human-face local feature vectors representing the facial points corresponding to respective resized local patches;
   and
   combining the resulting human-face local feature vectors representing the facial points corresponding to respective local patches to form human-face global feature vectors.

2. The method of claim 1, wherein using human-face local feature vector components extracted from respective local patches having a mutual correspondence relationship to form the human-face local feature vectors representing the facial points corresponding to the local patches comprises:
   identifying different poses of the same human-face image in a plurality of image frames of a video sequence;
   extracting human-face local feature vector components only from respective un-occluded local patches having a mutual correspondence relationship based on the identified different poses of the same human face in the plurality of image frames; and combining the human-face local feature vector components extracted from respective un-occluded local patches having a mutual correspondence relationship to form a human-face local feature vectors representing the facial points corresponding to the local patches.

3. The method of claim 1, wherein using human-face local feature vector components extracted from respective local patches having a mutual correspondence relationship to form human-face local feature vectors representing the facial points corresponding to the local patches comprises:
identifying different poses of the same human-face image in a plurality of image frames of a video sequence; and
weight combining the human-face local feature vector components extracted from respective local patches having a mutual correspondence relationship based on the identifed different poses of the same human face in different image frames to form human-face local feature vectors representing the facial points corresponding to the local patches.

4. The method of claim 1, wherein dividing the detected human-face image into a plurality of local patches with a predetermined size is implemented by adding a grid on the detected human-face image.

5. The method of claim 1, further comprising combining the resulting human-face local feature vectors representing the facial points corresponding to respective resized local patches to form human-face global feature vectors.

6. The method of claim 5, further comprising combining human-face global feature vectors obtained under different local patch sizes to form a human-face global feature vector set.

7. The method of claim 1, further comprising performing human-face recognition using the resulting human-face global feature vectors.

8. An apparatus, comprising:
at least one processor and at least one memory including a computer program code, wherein the at least one memory including the computer program code are configured, with the at least one processor, to cause the apparatus to:
detect a same human-face image in a plurality of image frames of a video sequence;
divide the detected human-face image into a plurality of local patches with a predetermined size, wherein each local patch is around or near a human-face feature point;
determine a correspondence relationship between respective local patches of the same human-face image in the plurality of image frames of the video sequence;
determine a first local feature from a first frame of the plurality of image frames of the same human-face image;
determine a second local feature, different than the first local feature, from a second frame of the plurality of image frames of the same human-face image;
use human-face local feature vector components extracted from respective local patches having a mutual correspondence relationship based on the first local feature and the second local feature of the first and the second frames of the same human-face image to form human-face local feature vectors representing facial points corresponding to the local patch, wherein formation of the human-face local feature vectors comprises resizing the plurality of local patches to obtain the human-face local feature vectors representing the facial points corresponding to respective resized local patches; and combine the resulting human-face local feature vectors representing the facial points corresponding to respective local patches to form human-face global feature vectors.

9. The apparatus of claim 8, wherein dividing the detected human-face into a plurality of local patches with a predetermined size is implemented by adding a grid on the detected human-face image.

10. The apparatus of claim 8, wherein the at least one memory including the computer program code are configured, with the at least one processor, to further cause the apparatus to combine the resulting human-face local feature vectors representing the facial points corresponding to respective resized local patches to form a human-face global feature vector.

11. The apparatus of claim 10, wherein the at least one memory including the computer program code are configured, with the at least one processor, to further cause the apparatus to combine the resulting human-face global feature vectors under different local patch sizes to form a human-face global feature vector set.

12. The apparatus of claim 8, wherein the at least one memory including the computer program code are configured, with the at least one processor, to further cause the apparatus to use the resulting human-face global feature vectors to perform human-face recognition.

13. The apparatus of claim 11, wherein the at least one memory including the computer program code are configured, with the at least one processor, to further cause the apparatus to use the resulting human-face global feature vector set to perform human-face recognition.

14. An apparatus comprising:
at least one processor and at least one memory including a computer program code, wherein the at least one memory including the computer program code are configured, with the at least one processor, to cause the apparatus to:
detect a same human-face image in a plurality of image frames of a video sequence;
divide the detected human-face image into a plurality of local patches with a predetermined size, wherein each local patch is around or near a human-face feature point;
determine a correspondence relationship between respective local patches of the same human-face image in the plurality of image frames of the video sequence;
determine a first local feature from a first frame of the plurality of image frames of the same human-face image;
determine a second local feature, different than the first local feature, from a second frame of the plurality of image frames of the same human-face image; and
use human-face local feature vector components extracted from respective local patches having a mutual correspondence relationship based on the first local feature and the second local feature of the first and the second frames of the same human-face image to form human-face local feature vectors representing facial points corresponding to the local patch, wherein the apparatus is further caused to:
identify different poses of the same human-face image in a plurality of image frames of a video sequence;
extract the human-face local feature vector components only from respective un-occluded local patches having a mutual correspondence relationship based on the identified different poses of the same human face in the plurality of image frames; and combine the human-face local feature vector components extracted from respective un-occluded local patches having a mutual correspondence relationship to form the human-face local feature vectors representing facial points corresponding to the local patches.

15. An apparatus
at least one processor and at least one memory including a computer program code, wherein the at least one memory including the computer program code are configured, with the at least one processor, to cause the apparatus to:
detect a same human-face image in a plurality of image frames of a video sequence;
divide the detected human-face image into a plurality of local patches with a predetermined size, wherein each local patch is around or near a human-face feature point;
determine a correspondence relationship between respective local patches of the same human-face image in the plurality of image frames of the video sequence;
determine a first local feature from a first frame of the plurality of image frames of the same human-face image;
determine a second local feature, different than the first local feature, from a second frame of the plurality of image frames of the same human-face image; and
use human-face local feature vector components extracted from respective local patches having a mutual correspondence relationship based on the first local feature and the second local feature of the first and the second frames of the same human-face image to form human-face local feature vectors representing facial points corresponding to the local patch, wherein the apparatus is further caused to:
identify different poses of the same human-face image in a plurality of image frames of a video sequence; and
weight combine the human-face local feature vector components extracted from respective local patches having a mutual correspondence relationship based on the identified different poses of the same human face in different image frames to form human-face local feature vectors representing the facial points corresponding to the local patches.

* * * * *

UNITED STATES PATENT AND TRADEMARK OFFICE
CERTIFICATE OF CORRECTION

PATENT NO. : 9,710,698 B2
APPLICATION NO. : 14/408729
DATED : July 18, 2017
INVENTOR(S) : Ma et al.

Page 1 of 1

It is certified that error appears in the above-identified patent and that said Letters Patent is hereby corrected as shown below:

In the Claims

<u>Column 17,</u>
Line 16, "identifed" should read --identified--.

<u>Column 19,</u>
Line 6, "apparatus" should read --apparatus comprising:--.

Signed and Sealed this
Third Day of April, 2018

Andrei Iancu
*Director of the United States Patent and Trademark Office*